United States Patent [19]

Hesse et al.

[11] 4,155,261

[45] May 22, 1979

[54] ARRANGEMENT FOR REGISTERING PRESSURE FLUCTUATIONS IN A PRESSURE SYSTEM

[75] Inventors: Horst Hesse; Herbert Busse, both of Stuttgart, Fed. Rep. of Germany

[73] Assignee: Robert Bosch GmbH, Stuttgart, Fed. Rep. of Germany

[21] Appl. No.: 888,851

[22] Filed: Mar. 22, 1978

[30] Foreign Application Priority Data

Mar. 22, 1977 [DE] Fed. Rep. of Germany ....... 2712481

[51] Int. Cl.² .................................... G01L 7/16

[52] U.S. Cl. .................................... 73/744

[58] Field of Search ................. 73/709, 744, 745, 746; 235/201 FS, 201 PF, 99 A, 99 R; 364/733, 734

[56] References Cited

U.S. PATENT DOCUMENTS

| | | | |
|---|---|---|---|
| 1,234,774 | 7/1917 | Kocourek | 73/744 |
| 1,836,655 | 12/1931 | Dunford | 235/99 R |
| 3,323,721 | 6/1967 | Topfer et al. | 235/201 FS |
| 3,707,264 | 12/1972 | Trigg et al. | 235/99 A |
| 3,836,071 | 9/1974 | Trigg | 235/99 A |
| 3,937,912 | 2/1976 | Martin | 73/744 |

*Primary Examiner*—Donald O. Woodiel
*Attorney, Agent, or Firm*—Michael J. Striker

[57] ABSTRACT

An arrangement for registering pressure fluctuations in a pressure system includes a sensing element which is subjected to the fluctuations of pressure applied thereto by the pressure system. The sensing element is operatively connected with a transmitting element, which transmits signals in response to the fluctuations of pressure sensed by the sensing element. The arrangement is further provided with a register (e.g., a counter), operatively connected to the transmitting element, for registering the pressure fluctuations.

12 Claims, 4 Drawing Figures

ARRANGEMENT FOR REGISTERING PRESSURE FLUCTUATIONS IN A PRESSURE SYSTEM

BACKGROUND OF THE INVENTION

The present invention relates to pressure systems, and more particularly this invention concerns an arrangement for registering pressure fluctuations in pressure systems.

Arrangement for registering the pressure fluctuations in pressure systems have already been proposed in the art.

However, it was recognized that the prior art arrangements are not satisfactory with respect to registering the fluctuations of pressure in pressure systems, as to the complexity and reliability of such arrangements.

SUMMARY OF THE INVENTION

It is a general object of the present invention to avoid the disadvantages of the prior art arrangements.

More particularly, it is an object of the present invention to provide a reliable and yet very simple arrangement for registering the pressure fluctions in pressure systems.

In accordance with an advantageous feature of the present invention it becomes possible to determine in a simple and reliable manner the value of each pressure fluctuation in the mass fluctuations and subsequently summing up the individual values of pressure fluctuations in order to judge the reversal of stresses in the pressure system and consequently to judge the durability of the same.

In pursuance of the objects, one feature of the present invention resides in a sensing member which is adapted to be subjected to the fluctuations of pressure applied thereto by a pressure system, transmitting means operatively connected to the sensing member. The transmitting means are operative for producing signals in dependence upon the fluctuations of pressure sensed by the sensing member.

According to a further concept of the present invention, the arrangement further comprises means operatively connected to the transmitting means and operative for summing up the individual signals received from the transmitting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
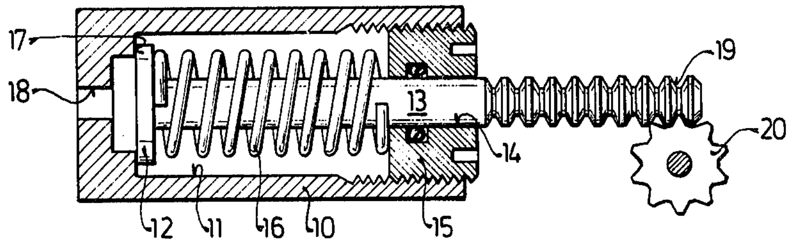
FIG. 1 is a longitudinal sectional view of a sensing member according to the present invention.
Figure 2:
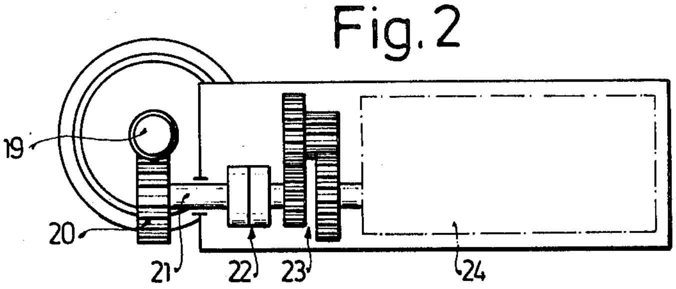
FIG. 2 is a view of transmitting means of the arrangement, according to the present invention.

Referring now to the drawings and first to FIG. 1 thereof, it may be seen, that the reference numeral 10 designates a hollow housing provided with a bore 11, closed at the trailing end of the housing 10 with a cover 15. The housing 10 is further provided at its leading end with a bore 18, communicating the bore 11 with a not-illustrated pressure system, for example a gas or fluid reservoir. The cover 15 is provided with a through-outgoing bore 14. A piston 12 with a piston rod 13 is movably positioned in the bore 11. The piston rod 13 projects with its end through the bore 14 in the cover 15 out of the housing 10. The piston 12 is biased by a spring 16 positioned on the piston rod 13 against a shoulder 17 provided at the leading end of the bore 11.

The portion of the piston projecting out of the housing 10 is provided with a rack portion 19, which engages with a pinion 20 mounted on a shaft 21. The shaft 21 connects the pinion 20 through a free-wheeling clutch 22 and a reduction gear element 23 with a register 24, e.g., a counter.

Should the piston 12 be subjected to pressure impulses, then the piston will move in the direction to compress the spring 16, to the right as shown in FIG. 1, so that the rack portion 19 of the piston rod 13 will rotate the pinion 20. This movement is transmitted through the free-wheeling clutch 22 and the reduction gear 23 to the register 24, where pressure fluctuations are summed-up in dependence upon the extent of the variations of these fluctuations. Depending upon the extent of the displacement of the piston (back or forth) the register 24 will be advanced by one unit, a fraction of a unit or a plurality of units to be counted.

The fluctuations which are within the range of fatigue limit, can be eliminated from registering by placing between the pinion 20 and the register 24 a gear coupling, formed as a free-wheeling clutch, so that indexing corresponding to these fluctuations may be fixed.

Figure 3:
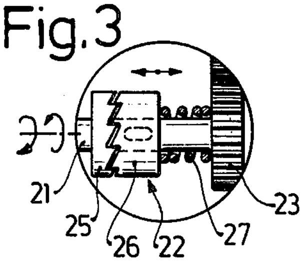
FIG. 3 is a view of the free-wheeling clutch.

FIG. 3 shows an embodiment of such a free-wheeling clutch. The clutch 22 consists of two cylindrical bodies, each provided with sawtooth shaped gearing. The second body is movable due to a biasing force of a spring 27. Such a construction of the clutch prevents the register 24 from turning in reverse direction. The tension of the spring 16 can be regulated by screwing or unscrewing the cover 15 into or out of the housing 10 respectively.

If only one and the same group of fluctuations is to be determined, separate arrangements are provided each having an individual register.

Figure 4:
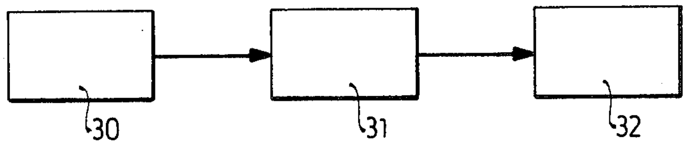
FIG. 4 is a schematic view of a second embodiment according to the present invention.

In the embodiment shown on FIG. 4, there are utilized in part electronic structural elements. The reference numeral 30 designates a preferably mechanic-electronic pressure pick-up (pressure switch with actuating member), which can include a power-supply unit, an amplifier, an adder, an integrating register or a function generator. An operating element 31 is connected with electronic register 32, so as to register pressure impulses.

The load alteration determined and registered by this arrangement is used for judgement of the durability of an investigated device, according to a corresponding stress-cycle diagram (Woehler-line). Should a volume and a duration of an action of the fluctuations during dynamic stresses be known, then the allowable load alteration of the structural elements can be determined (time and fatigue strength limit).

When different fluctuations occur, which follow each other in random succession, the above discussed arrangements serve as a register element controlling in reliable manner the operation of fluid-technique or other systems. Such a control is necessary, because not every structural element of such systems (proceeding from economical grounds) can be constructed to have sufficient fatigue strength. Particularly, it is important to exactly determine load alterations due to fluctuations, which can be judged according to time-fatigue strength limit, in pressure reservoirs and pressure-reservoir devices which accumulate energy. Uncontrollable energy release from reservoir or other structural elements can lead to serious damages.

The embodiment, shown in FIG. 4, can readily carry out the integration in accommodation to the Woehler stress-line diagram for non-linear stresses. The arrangement also is suitable (when using an appropriate pressure pick-up, such as for example tensile-strain strip gauges) for registering dynamic stresses of any other types.

It will be understood that each of the elements described above, or two or more together, may also find a useful application in other types of arrangements differing from the types described above.

While the invention has been illustrated and described as embodied in an arrangement for registering pressure fluctuations in a pressure system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for registering pressure fluctuations in a pressure system, comprising a sensing member adapted to be subjected to the fluctuations of pressure applied thereto by the pressure system and movable in response to said fluctuations in a first direction; resilient means for biasing said sensing member with a biasing force into a second direction opposite to said first direction for preventing said movement of said sensing member when said fluctuations are below a predetermined level; means for varying said biasing force of said resilient means; transmitting means connected with said member and operative for producing signals in dependence upon the fluctions of pressure sensed by said member; and summarizing means connected to said transmitting means and operative for summing up the individual signals received from said transmitting means.

2. An arrangement for registering pressure fluctuations in a pressure system, comprising a sensing member adapted to be subjected to the fluctuations of pressure applied thereto by the pressure system; transmitting means connected with said member and operative for producing signals in dependence upon the fluctuations of pressure sensed by said member; summarizing means operatively connected to said transmitting means and operative for summing up the individual signals received from said transmitting means; adjustable means for preventing fluctuations below a predetermined level from being transmitted from said sensing member onto said summarizing means; and means for adjusting said preventing means to different predetermined levels of fluctuations.

3. An arrangement for registering pressure fluctuations in a pressure system, comprising a sensing member adapted to be subjected to the fluctuations of pressure applied thereto by the pressure system; transmitting means connected with said member and operative for producing signals in dependence upon the fluctuations of pressure sensed by said member; summarizing means connected to said transmitting means and operative for summing up the individual signals received from said transmitting means; and means for preventing fluctuations above a predetermined level from being transmitted from said sensing member to said summarizing means.

4. An arrangement as defined in claim 3, wherein said preventing means include a free-wheeling clutch operatively connected with an input of said summarizing means.

5. An arrangement for registering pressure fluctuations in a pressure system, comprising a hollow housing having a leading open end communicating with said pressure system and a trailing end closed by a closing member having a hole therethrough; a sensing member adapted to be subjected to the fluctuations of pressure applied thereto by the pressure system, said sensing member being movably mounted in said housing toward said leading end, so that said member moves toward said trailing end in response to pressure applied thereto by the pressure system, said sensing member including a piston guided in said hollow housing, and having a piston rod projecting with an end portion thereof through said hole in the closing member beyond said trailing end of the housing, said piston being biased towards the leading end of the housing by a spring installed on the piston rod so that one end of the spring bears upon the piston and the other end bears upon said closing member, said closing member comprising a movable cover fitted within the internal wall of said trailing end of the hollow housing to thereby regulate the biasing force of the spring by moving said closing element in either direction relative to the interior of the housing; transmitting means connected with said member and operative for producing signals in dependence upon the fluctuations of pressure sensed by said member, and including a rack portion provided on said end portion of the piston rod; and summarizing means connected to said transmitting means and operative for summing up the individual signals received from said transmitting means.

6. An arrangement as defined in claim 5, wherein said closing element has an outer threaded portion and said housing has an inner threaded portion at said trailing end so as to movably receive said closing element.

7. An arrangement as defined in claim 5, wherein said transmitting means comprises a rotatable pinion meshing with said rack portion of said piston rod, said pinion being fixedly mounted on a shaft and rotatable therewith, said shaft being operatively connected with a gear train communicated with said summarizing means.

8. An arrangement as defined in claim 7, wherein said shaft is connected with said gear train through a coupling member.

9. An arrangement as defined in claim 8, wherein said coupling member is a free-wheeling clutch, to thereby prevent fluctuations below a predetermined level from being registered by said summarizing means.

10. An arrangement as defined in claim 9, wherein said clutch is a toothed clutch operative to prevent said summarizing means from turning back.

11. An arrangement as defined in claim 10, wherein said toothed clutch comprises a first section fixedly mounted on said shaft and a second section movably mounted on said shaft, said second section being biased in engagement with the first section by a spring mounted on said shaft.

12. An arrangement as defined in claim 5, wherein said transmitting means comprise a mechanical portion operative to produce mechanical signals in response to the fluctuations of pressure sensed by said member, and an electronic transmitting element operative to transform said mechanical signals into corresponding electrical signals.

* * * * *